United States Patent [19]

Lakhani

[11] Patent Number: 5,539,880
[45] Date of Patent: Jul. 23, 1996

[54] CABLE-BASED INTERACTIVE MULTIMEDIA WORKSTATION NETWORK

[76] Inventor: Abdul-Malik H. Lakhani, 3046 Victoria Heights, Gloucester, Ontario K1T 3M8, Canada

[21] Appl. No.: 127,340

[22] Filed: Sep. 28, 1993

[51] Int. Cl.$^6$ .................................................. G06F 13/00
[52] U.S. Cl. .................... 395/200.02; 364/DIG. 1; 364/DIG. 2; 364/222.2; 364/284; 364/284.4; 364/919; 364/919.2
[58] Field of Search ................................. 348/13, 15, 16, 348/14, 17, 18; 395/200, 250, 500, 800; 364/DIG. 1 MS File, DIG. 2 MS File

[56] References Cited

U.S. PATENT DOCUMENTS

| | | | |
|---|---|---|---|
| 5,208,665 | 5/1993 | McCalley et al. | 358/86 |
| 5,220,420 | 6/1993 | Hoarty et al. | 358/86 |
| 5,226,160 | 7/1993 | Waldron et al. | 395/650 |
| 5,343,240 | 8/1994 | Yu | 348/14 |
| 5,345,504 | 9/1994 | West, Jr. | 380/7 |
| 5,361,091 | 11/1994 | Hoarty et al. | 348/7 |

*Primary Examiner*—Robert B. Harrell
*Attorney, Agent, or Firm*—Herbert M. Shapiro

[57] ABSTRACT

An existing CATV co-axial cable system provides a two-way path between multimedia workstations and a control center and between multimedia workstations connected at nodes along the cable. Each node/workstation organization comprises at least one tuner/demodulator and a notch filter. The system of the present invention is suitable as a multimedia communications system for providing full motion picture transmission, high fidelity audio communications and data transmission, effectively multimedia communication in its true form.

15 Claims, 4 Drawing Sheets

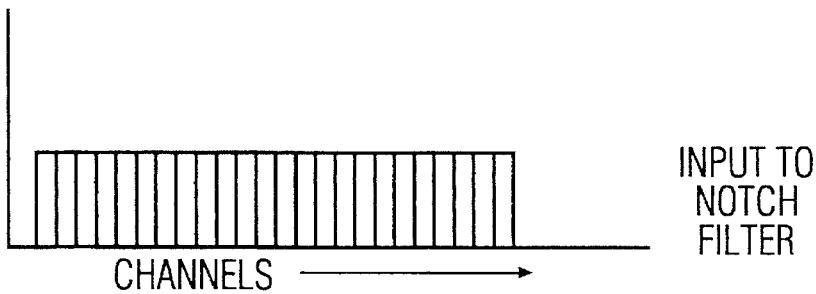
FIG. 5a INPUT TO NOTCH FILTER
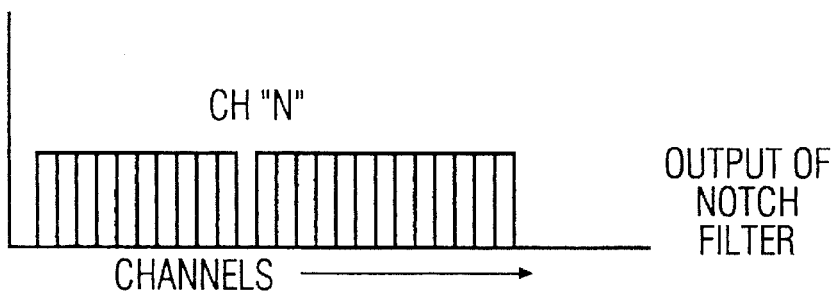
FIG. 5b OUTPUT OF NOTCH FILTER
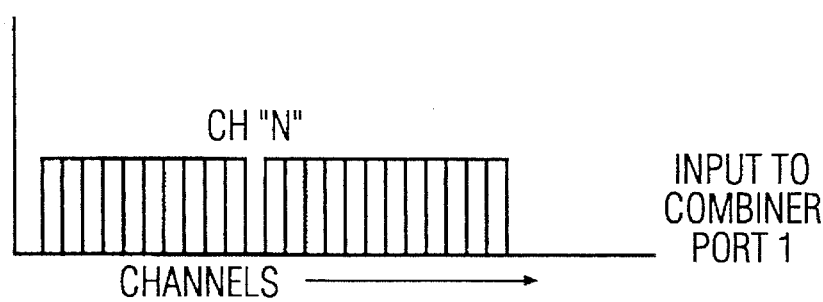
FIG. 6a INPUT TO COMBINER PORT 1
FIG. 6b INPUT TO COMBINER PORT 2
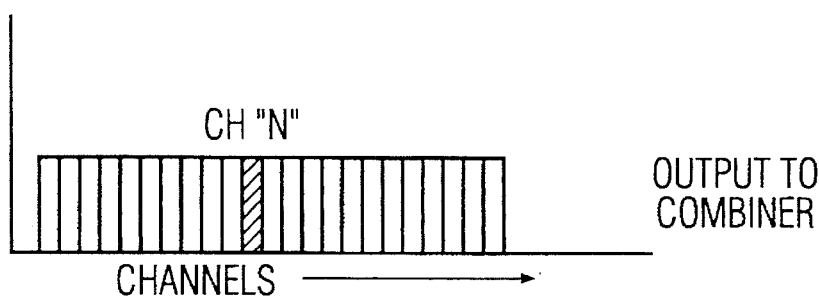
FIG. 6c OUTPUT TO COMBINER

5,539,880

CABLE-BASED INTERACTIVE MULTIMEDIA WORKSTATION NETWORK

FIELD OF THE INVENTION

This invention relates to networks for interconnecting multimedia workstations located at different locations and more particularly to such networks for permitting two-way broadband communication among workstations on the network.

BACKGROUND OF THE INVENTION

Prior Art

It has long been known to interconnect computer workstations to facilitate communications among those workstations by means of, for example, local area networks. A typical local area configuration is the so-called token ring local area network wherein the computers on the network are connected by a dedicated cable which connects the computers in series in a loop. Signals traverse the loop in one direction. When a signal is directed to a particular computer on the loop, circuitry at that computer detects the address information for itself and processes the signals from the loop. Such networks are complex, expensive, and normally limited to non-real time applications like data communications.

Similarly, computers have long been connected to other computers by means of existing or dedicated telephone lines by means of modems.

Further, prior art arrangements for providing full motion video transmission such as picturephone telephone systems called for the installation of special wires and switching systems capable of processing broadband signals. Such arrangements are prohibitively expensive for most applications. Picturephone telephones introduced in the 1960's were unsuccessful for this reason. The newly introduced videophones are not broadband devices but transmit instead many still images in succession or only the changes in the image from one frame to the next.

Broadband systems capable of providing full motion picture transmission, high fidelity sound, and data transmission are useful for a variety of applications. Such an application is especially beneficial to schools. In particular, the arrangement of the present invention would permit inexpensive interactive multimedia communications among classrooms and schools.

It is a feature of the present invention, therefore, that broadband transmission capability is provided cheaply and with little complexity.

It is a feature of the present invention that modified existing community TV cable installations are utilized to provide broadband transmission capability for interactive multimedia workstations connected to that cable system.

It is a related feature of this invention that computer workstations transmit and receive full motion picture signals, high fidelity audio signals and data signals by means of a community cable TV cable connection installed at the workstation location by the CATV provider.

BRIEF DESCRIPTION OF THE ILLUSTRATIVE EMBODIMENT OF THE INVENTION

In accordance with the teachings of the present invention a modified existing CATV co-axial cable system provides a two-way path between multimedia workstations and a control center and between multimedia workstations, connected at nodes along the cable. Each node/workstation comprises a least one tuner/demodulator, a signal splitter, a signal combiner, at least one modulator and a notch filter. In the illustrative embodiment of the present invention, the system is arranged to permit multimedia communications including full motion picture transmission, high fidelity audio communication and data transmission among the workstations. It is understood that the principles of the present invention are not limited to such multimedia applications nor are the principles of the present invention limited to broadband applications. A workstation which may be a personal computer (PC) and a television receiver of standard design and capable of displaying a television picture are connected to the cable through the node. Signals traversing the cable in one direction are split by the signal splitter at a node, sending part of the signal to the workstation tuner/demodulator and routing the remainder of the signal through the notch filter and signal combiner to the cable. Demodulated signals are then decoded by the computer workstation into picture, audio, and data signals. Correspondingly, signals generated at the computer workstation are encoded, modulated, and connected to the cable through a signal combiner. The notch filter located on the cable between the splitter and the combiner blocks signals in the dedicated frequency band for the node.

The node/workstation organization, specifically, the demodulator, notch filter, splitter, combiner and modulator permits the computer workstation associated with the node to send and receive numerous television signals over a looped cable by frequency division multiplexing. The ability to add address signals to a TV frame and the ability to add compressed audio and digital data signals to TV frames by techniques known to those skilled in the art permits the cable system with a plurality of node/workstations of this type to operate as a multimedia network analogous to baseband systems such as FDDI (Fiber Data Distributed Interface). Current forms of FDDI still do not support multimedia; they are suitable for non-real time applications like data and images. Excludes realtime applications like voice and video.

The invention further allows multiple baseband-type networks to exist on the same looped cable simultaneously due to its frequency division multiplexing and selective frequency blocking capabilities.

BRIEF DESCRIPTION OF THE DRAWINGS

FIG. 5a shows a frequency spectrum of an input signal into a notch filter.

FIG. 5b shows a frequency spectrum of an output signal from a notch filter.

FIG. 6a shows the frequency spectrum of an input signal into a Combiner Port 1.

FIG. 6b shows the frequency spectrum of an input signal into a Combiner Port 2.

FIG. 6c shows the frequency spectrum of an output signal from a Combiner.

Like reference numbers refer to like parts throughout the several views of the drawing.

DETAILED DESCRIPTION OF ILLUSTRATIVE EMBODIMENT OF THE INVENTION

Figure 1:
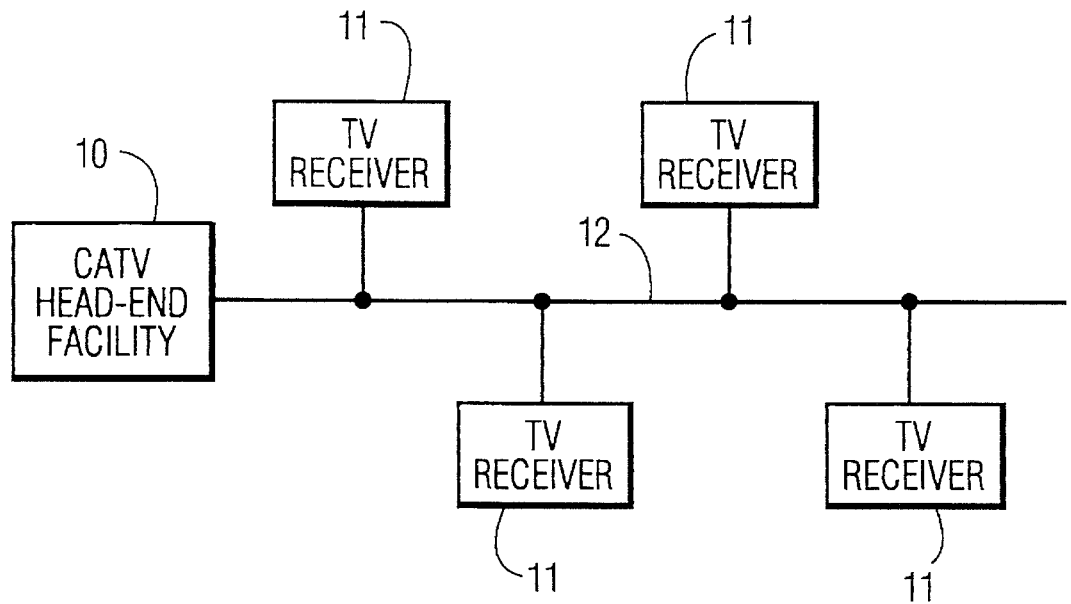
FIG. 1 is a diagram of a conventional CATV arrangement.

As stated, the invention will be described with particular reference to an Interactive multimedia arrangement particularly useful in an educational setting. As background, FIG. 1 shows a conventional community TV set up in which a CATV head-end facility 10 sends TV signals to television receivers 11 located along coaxial cable 12. The TV signals traverse the cable in a single direction under control of head-end facility 10.

Figure 2:
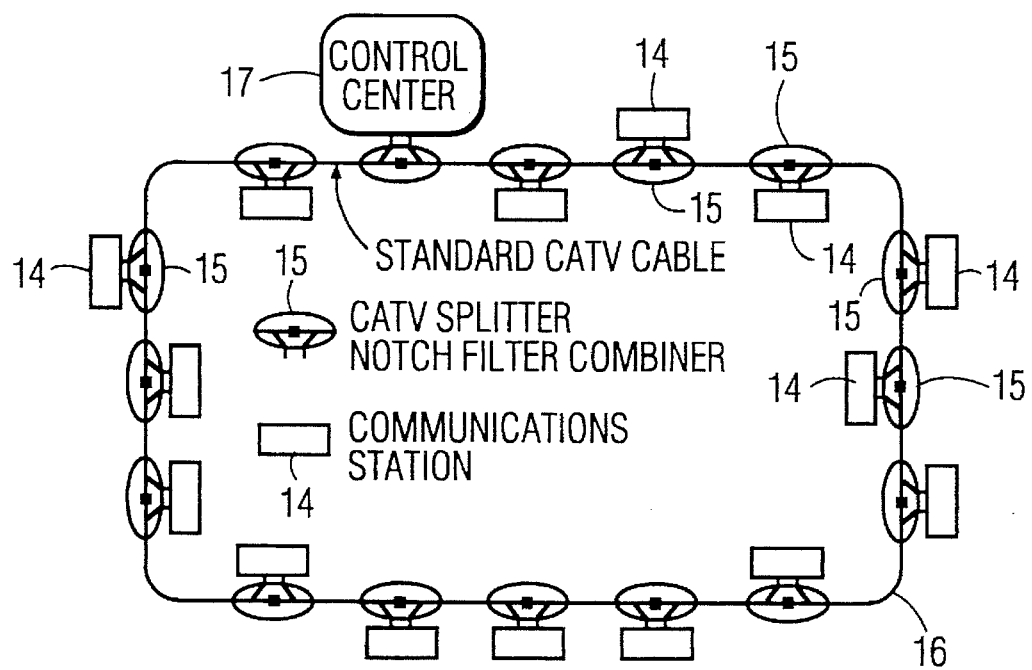
FIG. 2 is a simplified schematic illustration of a multinode network in accordance with the principles of this invention.

FIG. 2 is a simplified schematic diagram of the invention. With reference to FIG. 2, a number of communications station 14 are connected through nodes 15 to an interconnecting path 16. Control center 17 performs control functions depending on the network protocols and configuration in use. Nodes 15 split the signal traversing interconnecting path 16, block signals specific to the communication station with which it is associated and adds output signals from that station to interconnecting path 16.

Figure 3:
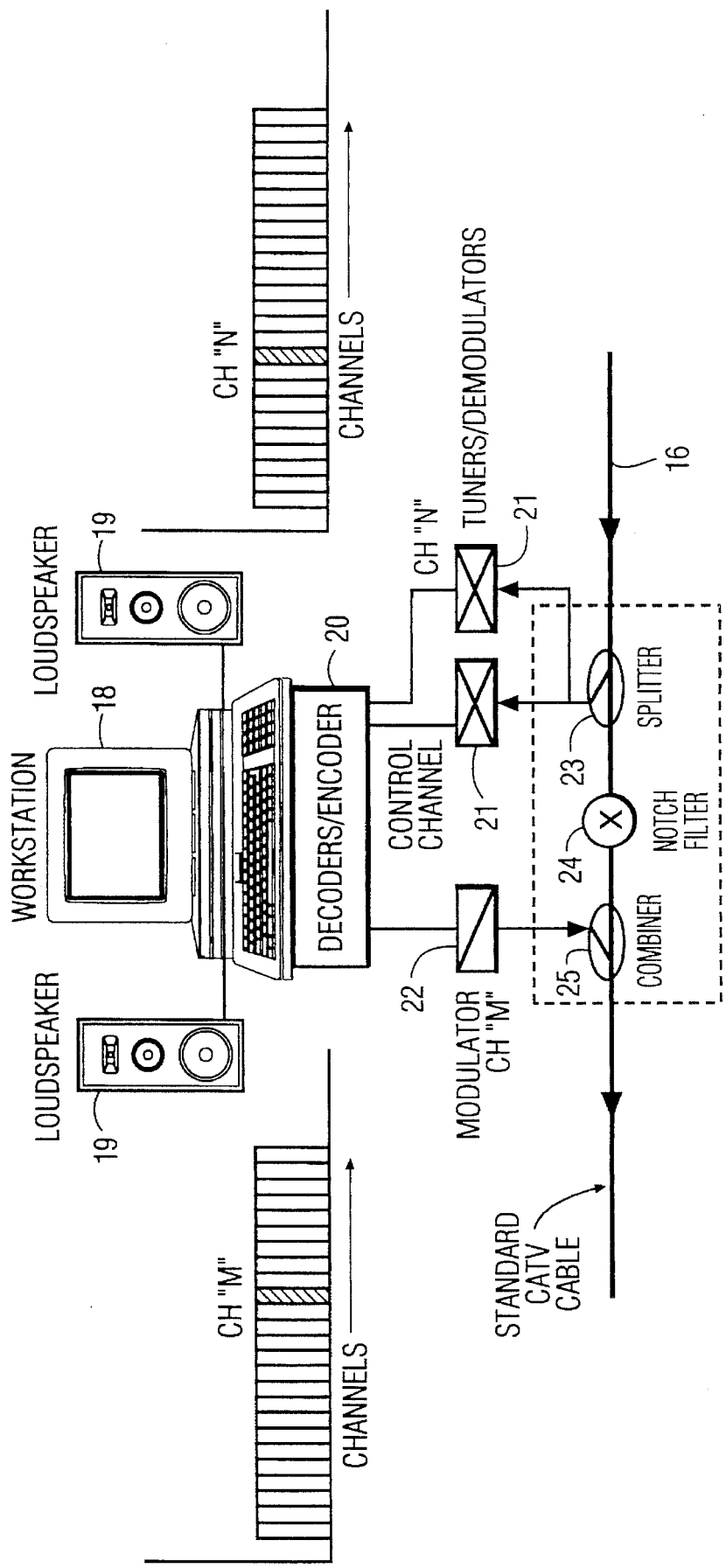
FIGS. 3 and 4 illustrate alternative network arrangements in accordance with the principles of the present invention.

FIG. 3 shows one arrangement in accordance with the principles of the present invention. In the arrangement of FIG. 3, the communications station might be a multimedia classroom comprising computer workstation 18, loudspeakers 19, encoder/decoder circuitry 20, two input signal tuners/demodulators 21, and an output signal modulator 22. The node situated along standard CATV coaxial cable 16 comprises signal splitter 23, notch filter 24 and signal combiner 25. Suitable notch filters and combiners are available commercially from, for example, Microwave Filter Company, Inc., East Syracuse, N.Y. as a "brickwall" channel deletion filter.

In this embodiment, the node chooses a single video channel N and transmits on single video channel M. Notch filter 24 on cable 26 filters out the single video channels M frequency band from the cable. The transmitting channel's frequency bandwidth and the notch filter's channel frequency bandwidth are at the same frequency.

On power-up control center 17 sends system status and so-called boot block information signals on a control channel along cable 16. The control channel also contains information such as a program guide. The control channel works like a barker station on most cable systems (i.e., program guide channel). In this particular case, most of the information on the control channel is digital in nature and requires a computer-based communication station to decode the information for the operator to understand it. The center also sends programs such as regular television programs on its other channels. The information in the video frames are pictures, compressed audio, digital data, or a combination of such signals. The boot block, system status, and program guide information are frequently transmitted on the control channel. Since control center 17 is the originator of the control channel, its notch filter filters out the control channel on the cable after receiving it and before the control channel is added with a combiner to the cable. Control center 17 also monitors the control channel to verify that the cable is complete and fully operational. The center also monitors all channels that are in its network continually.

On power-up of a communications station like that of FIG. 3, the communications station tunes into the control channel for its network by means of the tuner/demodulator 21 for the control channel and decoder/encoder 20. The communications station down loads a boot block signal and the system status signal into its local compute memory from the control channel. The communications station then sends a packet to the control center 17 on its preselected channel informing control center 17 that it is logged on the network. Control center 17 acknowledges the presence of the communications station by sending an acknowledgement to the communications station on the control channel. The communications station continually monitors the control channel. When the packet with the communications station's address is seen by the communication station, it captures and decodes the packet.

After viewing a menu of the available services on the system, the communications station's operator decides he or she wants to view a program that is not currently being broadcast by control center 17. The communication station sends a request for the program on its pre-selected channel. The request packet from the communication station contains an address for control center 17.

As mentioned above, control center 17 continually monitors all channels. When it receives a request from a communications station, it transmits an acknowledgement to the request to that communications station on its control channel. When control center 17 is ready to transmit the requested program to the communications station, it sends a packet addressed to the communications station on the control channel informing the communications station to tune its second demodulator 21 to, say, Channel J. The communications station continually monitors the control channel, when it sees a packet with its address on the control channel, it captures and decodes the packet. After having received the request from control center 17 to tune its second demodulator 21 to Channel J, the communications station tunes its second demodulator 21 to Channel J. The communications station then sends a packet to control center 17 informing the center it is ready to receive the information on Channel J. Upon receiving the acknowledgement packet from the communications station, control center 17 starts broadcasting the requested program on Channel J. Alternatively, one communication station on cable 16 may wish to communicate with another communications station on that cable. The first communications station informs control center 17 that it wants to communicate with the second communications station. Control center 17 informs the second communications station on the control channel that the first communications station wants to communicate on, say Channel K. Once an acknowledgement is received by the control center 17 from the second communications station, control center 17 informs the second communications station that the first communications station is communicating on Channel H and informs the second communications station that the first communications station is communicating on Channel K. The first communications station then tunes its second demodulator 21 to Channel H and the second communications station tunes its second demodulator 21 to Channel K. Once the first communications station is ready for communication it informs control center 17 (i.e., on Channel K). When the second communications station is ready, it informs control center 17 (i.e., on Channel H). Control center 17 then informs both communications stations that the other is ready on the channel previously agreed upon. Both stations now communicate with each other without the need of control center 17. In this case, control center 17 assumes the role of network administrator. Control center 17 does not interfere in the communication between the two stations but it still maintains a monitor on the channels to see if it is being addressed.

U.S. Pat. No. 4,429,332 entitled, "Television Compressed Audio" and U.S. Pat. No. 4,426,698 entitled "Television Digital Data with Error Correction" describe encoders and decoders operative to encode and decode compressed audio and data signals onto video frames, and U.S. Pat. No. 4,422,093 entitled "Television Burst Service" shows how to add address information to each such frame. The system as shown in FIG. 2 with communication station of the type shown in FIG. 3 are operative to transmit video and compressed audio and data signals selectively to a node on the same cable system, so long as each communication stations also includes an encoder and decoder. Any communication station not requiring the encoder would be operative with only a decoder which would allow video, compressed audio and digital data encoded into video to be decoded at the communication station. The adding of address information on each frame allows the addressing of each individual communication station individually or as a group.

Figure 4:
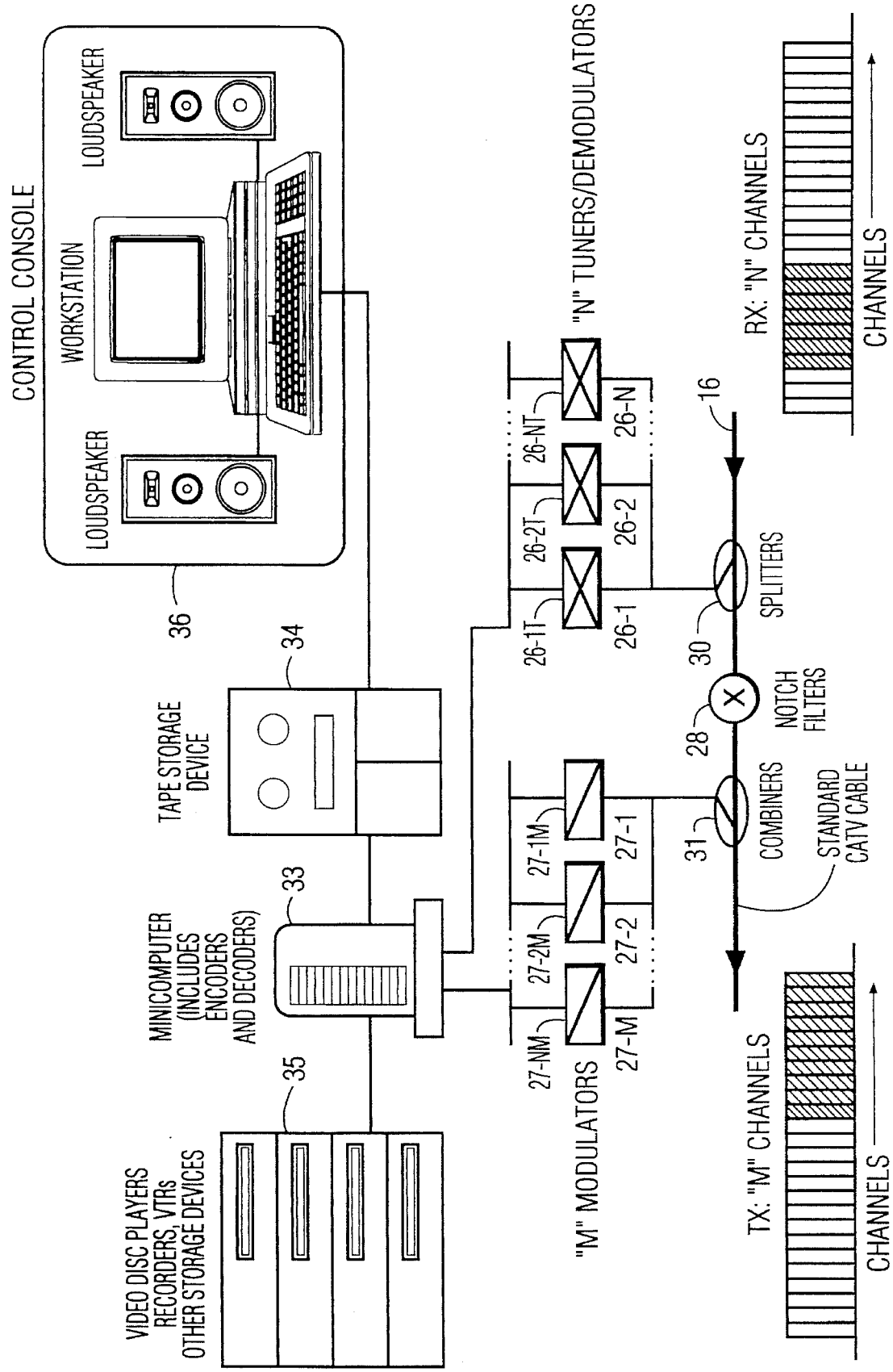

FIG. 4 shows, as another embodiment, Multimedia Control Center organization. The node itself, as stated, includes a signal splitter, a signal combiner, and a notch filter. The Multimedia Control Center includes a central processing unit (CPU) 33 which can comprise a minicomputer or a microcomputer, tuner/demodulators and modulators. The Multimedia Control Center also includes a "control Console." Control console 36 comprises a television receiver with monitor along with associated loudspeakers and for monitoring any of the signals on the cable network and communicating with the minicomputer. The center may also include storage devices such as tape storage devices 34, banks of videodisc recorders/players 35, or any other means for generating video formatted signals or for receiving such signals. Other digital storage devices can also exist with the minicomputer system.

The various components of the station are electrically connected to CPU 33 as shown. The CPU is connected to the node by means of input lines 26 and out put lines 27. As discussed above, the components of input and output lines and the operation of those components in accordance with the principles of this invention, allow the system to both send and receive audio and video signals as well as data over the standard cable system.

Specifically, each input line is coupled to the cable bus by the splitter 30. A single splitter may be used for more than one input line as shown in FIG. 4. FIG. 4 shows N input lines 26-1, 26-2, ... 26-N. Each line includes a tuner or demodulator 26-1T, 26-2T, ... 26-NT for tuning into a particular TV channel, much as is the case with the standard TV set.

Similarly, each output line is coupled to the cable by the combiner 31, which is operative as a reverse multiplexer to apply to the cable any modulated video signal on any output line 27. The individual output lines are designated 27-1, 27-2, ... 27-M, respectively, operative to apply to cable 16 a video signal in a characteristic frequency band. The modulators are labelled 27-1M, 27-2M, ... 27-NM and they apply signals confined within a frequency band to the cable on frequency bands not already in use. Notch filter 28 is on the main cable between the input and output lines. The signal carried in the frequency band on the cable is in no way restricted by the principles of this invention. The total cable bandwidth can be channelized into any appropriate frequency bandwidth. The preferred implementation of this invention refers to video channels but the channels could be any desired bandwidth.

The network arrangement of FIGS. 2, 3, and 4 are operative with a modified existing cable system. In baseband systems, there is no frequency envelope around a signal being transmitted. The signals for different nodes in a baseband system are separated via a time division multiplexing system. In the present system, a modulator imposes a frequency envelope around a video signal. Thus, the cable can have multiple video signals at different frequencies simultaneously without contamination. With the frequency division multiplexing capability of this invention multiple channels can simultaneously exist on the same cable at the same time. Furthermore, each of the channels can be time division multiplexed such as is done on a baseband system thereby achieving a frequency division and time division multiplexed system on the same cable network. More than one hundred baseband video channels can be frequency division multiplexed on a single existing broadband cable system in accordance with the principles of this invention.

The embodiment shown in FIGS. 2, 3, and 4 show the cable to be unbroken. This allows for any node on the cable to communicate with any other node on the system. FIG. 5a shows a typical frequency spectrum of an input signal to the Notch Filter. FIG. 5b shows the frequency spectrum of the output of the Notch Filter for an input signal as shown in FIG. 5a. The Notch Filter blocks the frequency band of the chosen channel "N" and allows the rest of the frequencies to pass unaffected. Besides blocking the channel it also acts as a channel terminator for the chosen channel on the network. Without the Notch Filter, the cable cannot be looped. Looping allows all nodes on the network to communicate with each other thereby permitting fully duplex communication on the cable. Without a completely looped cable nodes would only be able to communicate with other nodes down stream since the signal in this cable network only traverses one direction.

FIG. 6a shows the frequency spectrum for an input signal to the Combiner Port 1 which is the signal from the output of the Notch Filer. The frequencies for all channels except channel "N" are present at this input port. FIG. 6b shows the frequency spectrum of an input signal to the Combiner Port 2 which is the signal from the output of the modulator. This input only has the frequency of the chosen channel "N." FIG. 6c shows the frequency spectrum of an output signal of the Combiner. The Combiner's output contains the frequencies from both input ports. To guarantee that there is no signal contamination there cannot be frequency overlap in the two input signals into the Combiner.

The input signal to the node from the splitter has all the channel frequencies present on the cable. The node could in effect tune its demodulator to its own output channel and verify that the signal has not been contaminated down the line. This also insures that the cable loop is complete.

The cable loop can be extended by amplifiers to provide a much wider reach. The loop can also be extended by using other technologies like microwave links and fiber optics to provide a much greater reach.

By dedicating one channel of the one hundred channels or more defined in the cable system, in accordance with the present invention, as a control channel, each input line at each node would include at least two tuners or demodulators. One of those demodulators is tuned to the control channel frequency. The second is frequency agile tuned to any channel. The control channel includes timing, addressing, control, and format information. In this manner, the control center can communicate and interrupt all nodes that are tuned to the control channel. The control center "monitors" all channels and responds to requests from the nodes. Each channel on the system can be monitored by multiple stations or by all stations. Furthermore, by having frequency agile modulators, frequency agile demodulators, and frequency agile notch filters, the control center can dynamically allocate the allocated frequency bandwidth on the cable among the stations in its system. The control center can dynamically allocate the number of transmit and receive channels on demand. In addition, it can also time division multiplex and of the channel's frequency among the stations on the system. The control center in effect operates in a similar manner to a multi-user computer operating system that manages the resources on a microcomputer, minicomputer, or mainframe computer system. Multiple multimedia networks can coexist on a single cable as long as each multimedia network confines itself to within the allocated frequency bandwidth on the cable. An example of this would be where channels 1 to 20 are allocated to Multimedia Network A, channels 21 to 60 are allocated to Multimedia Network B, and Channels 61 to 97 are allocated to Multimedia Network C. Furthermore, a pair of channels can be allocated to Multimedia Network D where multiple workstations communicate using Time Division Multiplexing (TDM) and addressable link layer protocols similar to that used by Ethernet and Token Ring. The splitter, notch filters, and combiners on the cable would still need to work with the total frequency spectrum or all the networks on the cable. In essence, the Interactive Multimedia Workstation Network provides vastly more capacity and at the same time increases the network area (cable length) by hundreds of time (i.e., Ethernet has a cable length limit of approximately one mile). The number of nodes receiving information in this network is almost unlimited. Nodes can in effect send and receive full-motion video signals from other nodes on the cable. This invention in effect allows a completely full-duplex communication system on a cable where the signal traverses in one direction on the cable.

In a preferred embodiment of the Interactive Multimedia Network, each of the stations synchronizes its output channel to the control channel from the multimedia control center. This allows each of the stations to switch video channels at a predetermined time in the video signal such as the Vertical Blanking Interval (VBI) so that the viewer sees no flicker or roll during and after the channel switch. On many commercial cable systems in place now, the video channels are not synchronized to each other. When a television viewer switches channels, the viewer sees roll or flicker on the screen. Using a synchronized system and switching the channels during the VBI, insures that there is no flicker or roll on the television monitor. The television signal circuits synchronized to the new channel signal almost instantly in a synchronized system avoiding re-synchronization time as is the case with un-synchronized systems. The switching of video channels in a synchronized system is in effect transparent to the viewers.

There are a vast number of other communication protocols that can be carried out over this multimedia network as defined by this invention. The invention does not restrict the kinds of protocol that are possible on the multimedia network.

What is claimed is:

1. A communications network comprising a closed loop cable and a plurality of communications stations, each of said communications stations connected to said cable by means of an input line and an output line, for each of said communications stations at least one demodulator connected between said input line and said station and at least one modulator connected between said output line and said station, said network further comprising a signal splitter between said cable and said input line and a signal combiner between said output line and said cable and a computer connected to said modulator and demodulator for controlling signals applied to said cable.

2. Apparatus as in claim 1 wherein each of said communications stations comprises video frame signal decoding means for decoding audio signals and data signals encoded in video frame signals and transmitted to said communication station on said cable.

3. Apparatus as in claim 2 wherein at least one of said communications stations further comprises means for compressing said audio signals and said data signals.

4. Apparatus as in claim 3 wherein others of said stations comprise means for decompressing said audio signals and said data signals.

5. Apparatus as in claim 2 further comprising means at each of said communications stations for encoding and decoding address signals transmitted with said video signals each of which address signals is specific to a communications station.

6. Apparatus as in claim 5 wherein said video signals are television signals.

7. Apparatus as in claim 2 wherein each of said communications stations comprises video frame signal encoding means for encoding audio signals and data signals and for combining said encoded audio signals and data signals with video frame signals and for communicating said combined audio signals, data signals, and video frame signals to said output line of said communications station.

8. A communications network as in claim 1 wherein one of said communications stations comprises a head-end facility for controlling signals on said cable.

9. An arrangement as in claim 8 wherein signals comprising one channel of a plurality of channels on said network comprise a control channel for controlling signals on said cable.

10. Apparatus as in claim 9 wherein said control channel controls the transmission of signals within different frequency bandwidth groups among said communications stations each of said frequency groups forming a virtual network path on said cable.

11. An arrangement as in claim 1 wherein signals traversing said cable are grouped by frequency into channels and wherein each of said communications stations further comprises frequency division multiplexing means for detecting and separating signals within different bands of channels thereby simulating multiple network transmission apparatus.

12. An arrangement as in claim 11 wherein said head-end facility and each of said communications stations further comprise time division multiplexing means for separating signals transmitted on and received from said cable into time specific components.

13. Apparatus as in claim 1 wherein more than one of said communications stations comprises a multimedia control center each arranged to control the transmission of signals each within a different frequency bandwidth among selected communications stations on said cable.

14. An analog arrangement for electronically linking in a closed loop a plurality of communication stations one of which stations is a control static said arrangement comprising interconnecting means for conducting electrical signals to said stations and a node at each of said stations comprising a signal splitter for applying a first component of a set of signals from said interconnecting means to said station; a notch filter for blocking selected frequency components from a second component of said set of said signals from said interconnecting means; and a signal combiner for combining output signals from said station with output signals from said notch filter and for applying said combined output signals to said interconnecting means, wherein said interconnecting means comprises a closed loop television coaxial cable system.

15. An arrangement as in claim 14 wherein selected frequency components of said set of signals from said interconnecting means comprise control signals and said notch filter at each of said stations blocks control signal frequency components specific to said station.

* * * * *